US010241989B2

(12) United States Patent
Goyal

(10) Patent No.: US 10,241,989 B2
(45) Date of Patent: Mar. 26, 2019

(54) DISPLAYING DOCUMENT MODIFICATIONS USING A TIMELINE

(71) Applicant: Adobe Inc., San Jose, CA (US)

(72) Inventor: Shivam Goyal, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 73 days.

(21) Appl. No.: 14/283,673

(22) Filed: May 21, 2014

(65) Prior Publication Data
US 2015/0339282 A1 Nov. 26, 2015

(51) Int. Cl.
*G06F 17/24* (2006.01)
*H04N 5/262* (2006.01)
*G06F 17/22* (2006.01)
*G06F 17/21* (2006.01)

(52) U.S. Cl.
CPC ............ *G06F 17/241* (2013.01); *G06F 17/21* (2013.01); *G06F 17/2288* (2013.01); *H04N 5/262* (2013.01)

(58) Field of Classification Search
CPC .. G06F 17/241; G06F 17/21; G06F 17/30896; G06F 17/2288; H04N 5/262
See application file for complete search history.

(56) References Cited

U.S. PATENT DOCUMENTS

| 7,739,584 | B2 * | 6/2010 | Vella | H04N 5/445 715/200 |
| 8,151,343 | B1 * | 4/2012 | Wang | G06F 21/31 705/67 |
| 8,373,741 | B2 * | 2/2013 | Roberts | G06Q 10/10 348/14.04 |
| 9,092,405 | B1 * | 7/2015 | Hayden | G06F 17/2288 |
| 9,185,134 | B1 * | 11/2015 | Story, Jr. | G06Q 10/10 |
| 2004/0128317 | A1 * | 7/2004 | Sull | G06F 17/30849 |
| 2005/0075979 | A1 * | 4/2005 | Leavitt | G06Q 20/00 705/40 |
| 2006/0106627 | A1 * | 5/2006 | Al-Nujaidi | G06Q 10/10 705/310 |
| 2006/0161838 | A1 * | 7/2006 | Nydam | G06F 17/241 715/202 |
| 2006/0282776 | A1 * | 12/2006 | Farmer | G11B 27/34 715/719 |
| 2007/0220068 | A1 * | 9/2007 | Thompson | G06F 17/3023 |
| 2008/0034013 | A1 * | 2/2008 | Cisler | G06F 9/4443 |
| 2009/0083631 | A1 * | 3/2009 | Sidi | G06Q 30/02 715/721 |
| 2009/0150887 | A1 * | 6/2009 | Sanghvi | G06F 8/71 718/102 |
| 2009/0172511 | A1 * | 7/2009 | Decherd | G06F 17/3087 715/207 |
| 2010/0241953 | A1 * | 9/2010 | Kim | H04N 21/85406 715/256 |
| 2010/0306171 | A1 * | 12/2010 | Antos | G06F 11/1448 707/638 |

(Continued)

*Primary Examiner* — Thu V Huynh
(74) *Attorney, Agent, or Firm* — Keller Jolley Preece

(57) ABSTRACT

Methods for presenting document changes including providing an interactive timeline. The interactive timeline allows a user to select and view various states or versions of a document. In particular, the interactive timeline provide a chronological order of changes or modifications to the document. Reviewers can quickly and easily follow the lifecycle of the document based on the information presented in the interactive timeline.

20 Claims, 11 Drawing Sheets

(56) References Cited

U.S. PATENT DOCUMENTS

| | | | |
|---|---|---|---|
| 2012/0140083 A1* | 6/2012 | Schultz | H04N 21/42202 348/207.1 |
| 2013/0097481 A1* | 4/2013 | Kotler | G06F 17/241 715/230 |
| 2013/0120439 A1* | 5/2013 | Harris | G11B 27/034 345/619 |
| 2013/0132818 A1* | 5/2013 | Anders | G06T 13/00 715/234 |
| 2013/0145269 A1* | 6/2013 | Latulipe | G06F 3/048 715/720 |
| 2013/0174137 A1* | 7/2013 | Kim | G06F 8/65 717/171 |
| 2014/0033088 A1* | 1/2014 | Shaver | G06F 17/2288 715/764 |
| 2014/0281875 A1* | 9/2014 | Branton | G06F 17/241 715/230 |
| 2014/0310623 A1* | 10/2014 | O'Connell, Jr. | G06F 17/30064 715/764 |
| 2014/0365886 A1* | 12/2014 | Koenig | G06F 3/04817 715/711 |
| 2015/0370769 A1* | 12/2015 | Pereira Filho | G06F 17/21 726/28 |

\* cited by examiner

DISPLAYING DOCUMENT MODIFICATIONS USING A TIMELINE

BACKGROUND

1. Technical Field

One or more embodiments relate generally to systems and methods for document tracking. More specifically, one or more embodiments relate to systems and methods of presenting document modifications using a navigable timeline.

2. Background and Relevant Art

Different types of documents (e.g., text documents, web pages, designs, slideshows, audio, video) can undergo many revisions before final approval. Various applications include functionality for tracking changes made to document. Document tracking can allow one or more reviewers to provide feedback on content that should be included in a document.

Some conventional document tracking systems annotate changes using different colors or other visual cues to mark the changes. For example, some systems mark changes by a first user in a first color, and mark changes by a second user in a second color. While the colors can indicate the different users contributing to the document, the colors may not indicate a sequence of modifications, making it difficult to determine which changes were most recently made.

Reviewers often pass a document back and forth making multiple changes to the document. Because changes can overlap, distinguishing the changes can become confusing and difficult. Conventional document tracking systems often indicate a reviewer and a time at which the changes were made to allow other reviewers to determine who made a particular change and when the change was made. Although displaying the time at which changes are made can provide reviewers with useful information for determining a flow of changes in the document, merely displaying the time in connection with the changes may not provide an easily readable format for determining the flow of changes.

Additionally, conventional document tracking applications typically allow users to approve or reject changes within a document. In particular, a reviewer can approve or reject changes made by the same or a different reviewer in a previous version of the document. When a change is rejected or approved, the markup for the change may be removed from the document leaving no indication that the change was ever made. By removing the markups from the document, reviewers may have no way to determine when, or if, certain changes were made. Indeed, in many cases a user many need to review previous versions of the document to determine all changes to the document. Reviewing various versions of a document can be time consuming and difficult.

In addition, to ensure that the most recent changes are included, collaborative documents using traditional tracking methods with more than one reviewer may require reviewers to keep track of which version of the document is most recent. Reviewers may use different naming conventions, making it difficult for other users to determine which version is the most recent. Furthermore, reviewers may not always share every version of the document with every other reviewer, potentially resulting in conflicting versions of the document.

These and other disadvantages may exist with respect to conventional document tracking applications.

SUMMARY

One or more embodiments of the present invention provide benefits and/or solve one or more of the foregoing or other problems in the art with systems and methods for presenting document changes using a navigable timeline. For example, one or more embodiments provide a graphical timeline that represents a chronological order of changes or modifications to a document. The timeline can allow reviewers to view the changes to the document according to the time in which the changes were made. Thus, the timeline can provide a way for reviewers to quickly and easily follow the flow of changes made over the life of the document.

The methods and systems disclosed herein can provide improvements in document tracking by simplifying and centralizing the way in which reviewers can view a change history for a document. In particular, an interactive timeline can present changes made to a document based on the order in which the changes were made/received. By presenting the changes in a navigable timeline, reviewers can easily discern when and who made each change over the lifecycle of the document.

Additionally, the timeline can provide functionality for approving or rejecting modifications in the document. In particular, the timeline can allow a reviewer to view changes made by other reviewers and select whether to approve or reject the individual changes. In some embodiments, the timeline and changes to the document can be stored in a single/central location that provides access to all of the reviewers. Thus, one or more embodiments can allow reviewers to make changes and approve/reject changes without requiring the reviewers to send multiple revised documents back and forth numerous times.

Additional features and advantages of one or more embodiments of the present invention will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features of the invention may be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
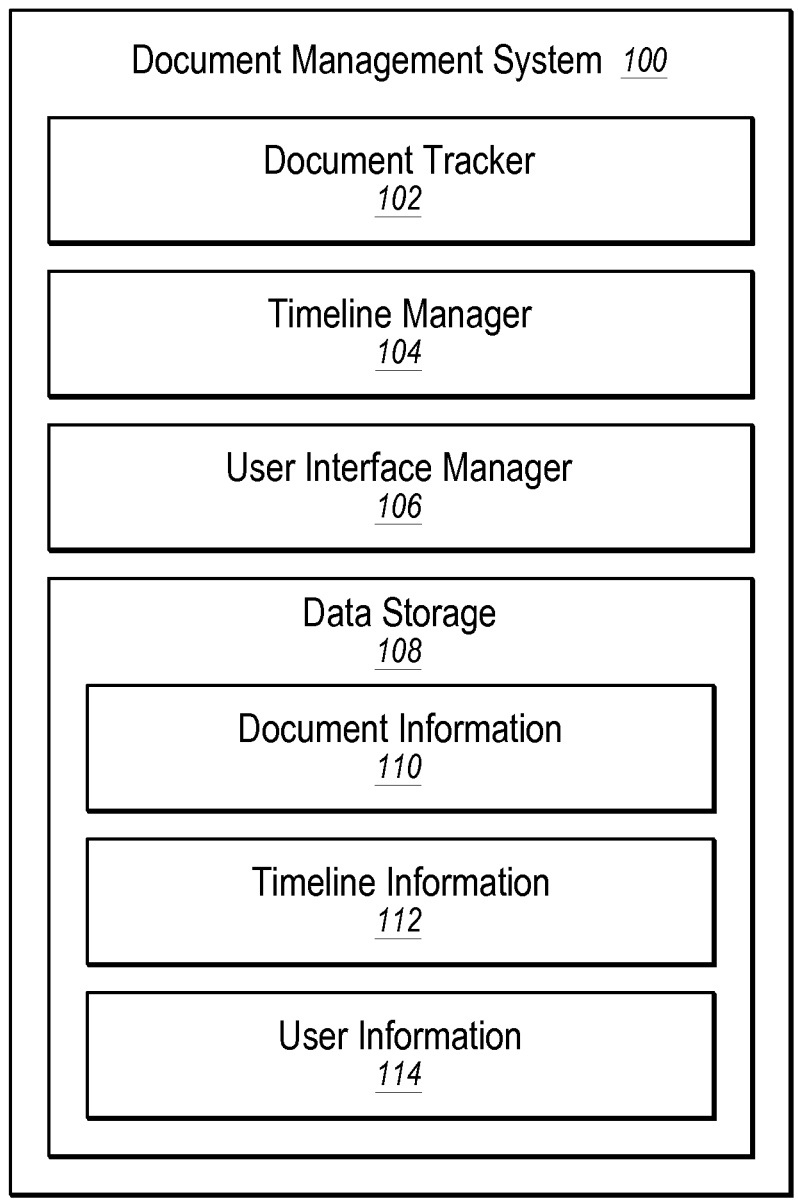
FIG. 1 illustrates a schematic overview of one embodiment of a document management system in accordance with one or more embodiments.

One or more embodiments include a document management system that presents document changes. The document management system provides a timeline to view changes to a document. In particular, the timeline can be an interactive graphical timeline that represents a chronological or received order of changes or modifications to the document. Reviewers can quickly and easily follow the lifecycle of the document based on the information presented in the interactive timeline.

For example, the timeline can present the changes and/or different versions of the document in an order in which the document management system received the changes. Presenting the changes in chronological (received) order allows reviewers to easily navigate the changes to determine when a specific piece of content was added to the document and who added the content.

In one or more embodiments, the document management system can store changes in a single location. For example, the document management system can store documents and changes to the documents on a server accessible to one or more reviewers. Additionally, the document management system can store the timeline in connection with the documents and changes, such that the timeline is also accessible to the reviewers. By allowing the reviewers to access to the document and timeline, the document management system provides the reviewers with a navigable history of changes for the document, while avoiding problems caused by inconsistencies in document naming conventions and communications between reviewers.

Additional embodiments of the document management system include presenting comments in the timeline in association with the changes. In particular, the timeline can include comments from one or more reviewers. For example, a reviewer can view a particular change to a document, and can then provide a comment about the particular change for other reviewers to see. The comments for each change are viewable in the timeline in association with the corresponding change. Thus, reviewers can easily communicate with other reviewers and view feedback left by other reviewers for a particular change.

Still further embodiments include providing functionality for approval or rejection of changes in a document. Specifically, a reviewer can view changes made by other reviewers and select whether to approve or reject the individual changes within the timeline. In some embodiments, reviewers can approve or reject individual elements within a particular version of the document. Thus, the timeline allows reviewers to collaborate with one another to include desired content in the document without requiring reviewers to email or otherwise send documents back and forth numerous times.

In some embodiments, the document management system can provide a time-lapse video of changes made to a document. In particular, the timeline can utilize the changes to generate a video or slideshow of the lifecycle of the document. In some instances, a time-lapse video can provide reviewers with a brief overview of how the document has evolved, which may be particularly useful in applications that involve the use of several graphical elements that change throughout the course of a document editing process. For example, a time-lapse video can be particularly useful in design applications to show changes that have been made to a particular design project.

As used herein, the term "change" refers to any modification of a document. In particular, a "change" can comprise an addition, a deletion, or an alteration to a document. For example, "changes" to a document can include modifications to text, images, video, audio, and/or other content in the document. When a "change" is made to the document, the application or other component can track and store information associated with the change for presenting in the timeline.

As used herein, the term "state of the document" refers condition or version of a document at a given time. Thus, in one or more embodiments each "state of the document" can represent a separate stored version of the document. In another example, a "state of the document" can be a particular view of the document presented in connection with the timeline based on changes (or deltas) stored for the document. The changes (or deltas) may be overlaid on top of an original version of the document to show the document with the changes.

FIG. 1 illustrates a schematic overview of one embodiment of a document management system 100. The document management system 100 may include, but is not limited to, a document tracker 102, a timeline manager 104, a user interface manager 106, and a data storage 108. Each of the components of the document management system 100 can be in communication with one another using any suitable communication technologies. It will be recognized that although the components of the document management system 100 are shown to be separate in FIG. 1, any of the components may be combined into fewer components, such as into a single component, or divided into more components as may serve a particular implementation.

The components can comprise software, hardware, or both. For example, the components can comprise one or more instructions stored on a computer-readable storage medium and executable by processors of one or more computing devices (e.g., client devices and/or server devices). When executed by the one or more processors, the computer-executable instructions of the document management system 100 can cause the computing device(s) to perform the document management methods described herein. Alternatively, the components can comprise hardware, such as a special purpose processing device to perform a certain function or group of functions. Additionally or alternatively, the components can comprise a combination of computer-executable instructions and hardware.

Furthermore, the components of the document management system 100 may, for example, be implemented as a stand-alone application, as a module of an application, as a plug-in for applications including image processing applications, as a library function or functions that may be called by other applications such as image processing applications, and/or as a cloud-computing model. Thus, the components of the document management system 100 may be implemented as a stand-alone application, such as a desktop or mobile application. Alternatively or additionally, the components of the document management system 100 may be implemented in any application that allows users to modify documents, including but not limited to ADOBE PHOTOSHOP, ADOBE PHOTOSHOP ELEMENTS, ADOBE ILLUSTRATOR, ADOBE ACROBAT, ADOBE CAPTIVATE, ADOBE INDESIGN, and ADOBE PRESENTER. "ADOBE," "PHOTOSHOP," "ELEMENTS," "ILLUSTRATOR," "ACROBAT," "CAPTIVATE," "INDESIGN," and "ADOBE PRESENTER" are registered trademarks of Adobe Systems Incorporated in the United States and/or other countries.

As mentioned above, the document management system 100 can include a document tracker 102. In one or more embodiments, the document tracker 102 facilitates tracking changes to documents within the document management system 100. For example, the document tracker 102 can determine when any change is made to a document in a particular action. To illustrate, the document tracker 102 can determine that a user having access to the document has made one or more changes to the document. The user can make a change to the document by accessing the document in an application associated with the document and modifying the document from within the application.

Additionally, the document tracker 102 can manage documents associated with a plurality of applications and containing any type of content. In particular, the documents can be associated with applications that allow users to edit the documents based on the document type and the application. For example, a word processing application can allow users to edit text, images, or other content within the documents. Other types of applications can allow the users to edit other types of content or additional content (e.g., video, audio).

As described above, the document management system 100 can include a timeline manager 104. In one or more embodiments, the timeline manager 104 can facilitate management and presentation of an interactive timeline for one or more documents. For example, the timeline manager 104 can generate a timeline to allow users to view any changes made to a document. The timeline may allow users to select certain points in time corresponding to changes made to the document. When a user selects a particular point, the timeline can retrieve information associated with the change or state of the document for presenting to the user.

The document management system 100 can also include a user interface manager 106. In some embodiments, the user interface manager 106 can facilitate the presentation of the timeline with information associated with the document. In particular, the user interface manager 106 can provide a graphical user interface for presenting the timeline. The user interface manager 106 can detect a selection from a user to display the timeline for a document and then present the timeline in the graphical user interface.

Additionally, the document management system 100 can include a data storage 108 to facilitate storage of information for the document management system 100. In particular, the data storage 108 can store information used by one or more of the components in the document management system 100 to facilitate the performance of various operations. In one embodiment as shown in FIG. 1, the data storage 108 maintains document information 110, timeline information 112, and user information 114. The data storage 108 may also store any additional or alternative information corresponding to the operation of the document management system 100. The data storage 108 can maintain additional or alternative data as may serve a particular implementation. The data storage 108 may communicate with any component within the document management system 100 to obtain or share information for tracking and viewing document changes associated with the document management system 100. In one embodiment, the data storage 108 includes one or more servers on which images or other information is stored. For example, the data storage 108 may include a distributed storage environment.

In some instances, the document information 110 can include data corresponding to a document associated with a particular application. In particular, the document information 110 may allow the document management system 100 to maintain a history of changes to the document. For example, the document information 110 can include identification information for the document, a plurality of changes to the document, times associated with each of the changes, and other information that allows the document management system 100 to identify the document and organize the changes in an interactive timeline for presenting to one or more users.

One or more embodiments of the data storage 108 may also maintain timeline information 112. In particular, the data storage 108 may store information corresponding to an interactive timeline associated with a particular document. For example, the timeline information 112 can include an order of changes to be presented in the timeline in connection with the document, types of changes, presentation data for appropriately representing the document information 110 in the timeline, comments associated with the changes, and other information associated with the timeline.

In some embodiments, the data storage 108 can maintain user information 114. Specifically, the data storage 108 may store information corresponding to one or more users who have access to a particular document. For example, the user information 114 can include access rights associated with the users, user identification information, client device information associated with the users, user account information, and other information that may allow the document management system 100 to manage user access and user input to the document.

Although the data storage 108 in FIG. 1 is described to include document information 110, timeline information 112, and user information 114, the data storage 108 can include additional or alternative information related to the document management system 100. For example, the data storage 108 may include information for the applications associated with the documents. In one or more embodiments, the data storage 108 can include information for other types of systems and processes. For example, the data storage 108 can be a distributed storage space configured to interface with one or more systems in addition to the document management system 100, allowing the different systems to interact with one another.

Figure 2:
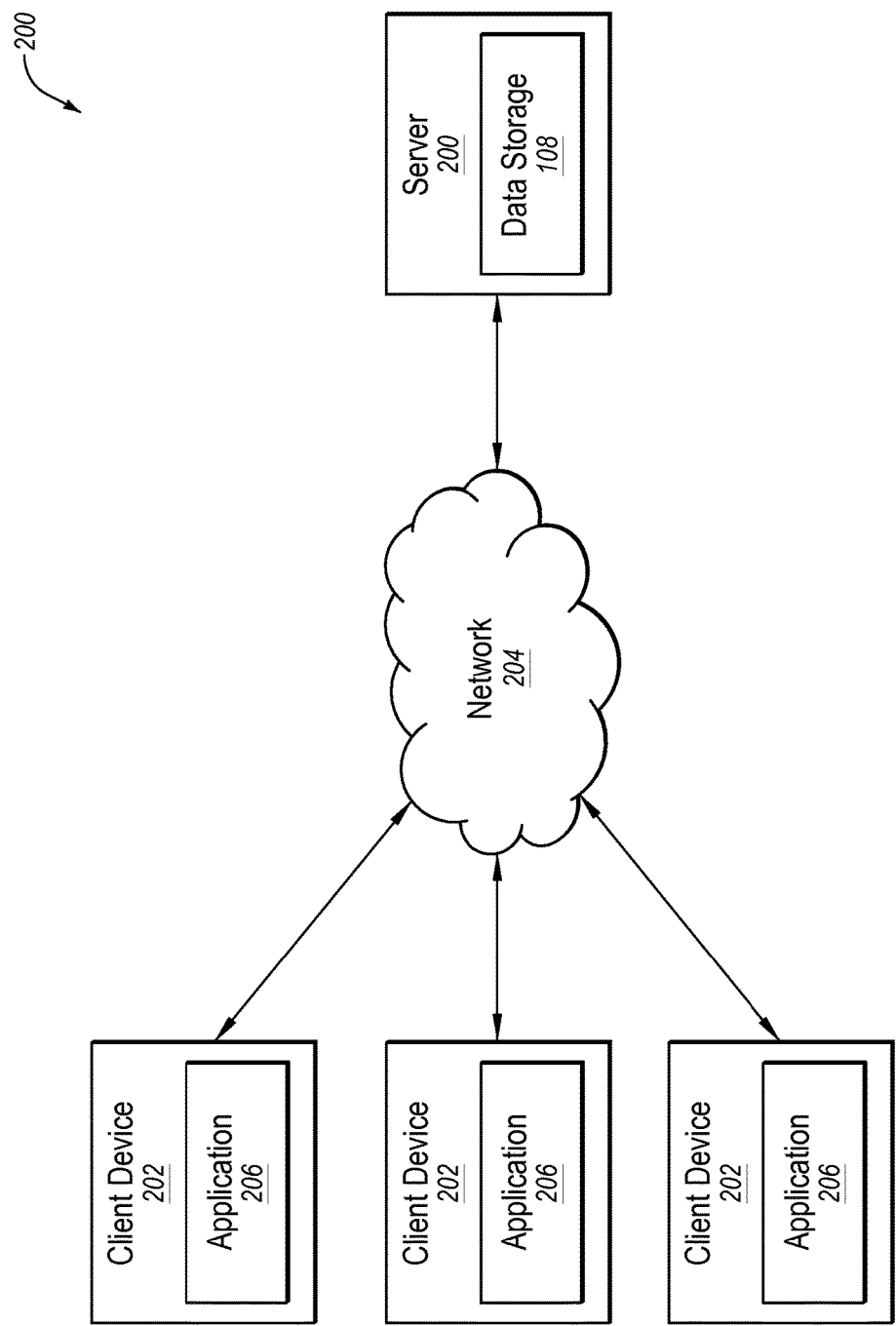
FIG. 2 illustrates a schematic diagram of one embodiment of the document management system of FIG. 1 in accordance with one or more embodiments.

As previously mentioned, in one embodiment the document management system 100 can track changes for a document and store the changes in a central location. FIG. 2 illustrates a schematic diagram of one embodiment of the document management system 100. In one embodiment, the document management system 100 includes a server 200 connected to a plurality of client devices 202 via a network 204. Although the document management system 100 of FIG. 2 is depicted as having various components, the document management system 100 may have any number of additional or alternative components. For example, the document management system 100 can be implemented on a single computing device.

In some implementations, the document management system 100 facilitates document tracking for a document that may be accessed by one or more users. In particular, the document management system 100 can include a server 200 for storing the document and information associated with the document. As described above, the server 200 may communicate with one or more client devices 202 via the network 204 to allow collaborative documents involving a plurality of users. The network 204 may include a local network connection or a remote network connection (e.g., an Internet connection) or any of the networks described below in relation to FIG. 7.

Each client device 202 may be associated with one or more users capable of accessing the document. In particular, each user may have permissions to view and/or edit the document using a corresponding application 206. For example, each client device 202 may include an instance of the application 206 to allow one or more users for each client device 202 to interact with the document. In other embodiments, the users may access the application 206 via a remote connection to an instance of the application 206 running on the server 200. The application 206 can also allow the users to view the timeline associated with the document and interact with other users reviewing the document, such as by allowing users to comment on changes made to the document.

In one or more embodiments, the application 206 can be any application 206 that allows users to interact with a document. Particularly, the application 206 can be an application 206 that provides users with an interface for interacting with documents containing one or more types of content. For example, an application 206 can provide an interface for editing and viewing a document containing text, images, video, audio, and/or a combination of multiple types of content. Additionally, the application 206 can allow users to comment on changes made in the document and vote to approve/reject changes by other users in a collaborative editing process.

In some embodiments, the document can be stored at the server 200. Specifically, the data storage 108 at the server 200 can store the document and information associated with the document, such as described above in FIG. 1. For example, the data storage 108 can store changes to the document for presenting in the timeline for the document. In some embodiments, the data storage 108 can store multiple versions of the document, highlighting the changes with each new version. In alternative embodiments, the data storage 108 can store the changes separately from a full version of the document, such that the data storage 108 maintains a delta representing each change to the document.

The server 200 may include the data storage 108 described in FIG. 1 to store information for the document management system 100. In some embodiments, storing information for the document management system 100 at the server 200 can provide an accessible storage location for all reviewers to access. In particular, the server 200 can be part of a cloud storage system that users can access from any device via a corresponding application 206. For example, multiple users can access the document, the information for the document, and/or the timeline interface at the same time on the server 200. The document management system 100 can manage the user access to verify that updates from users are visible to other users in real time.

In some embodiments, the document management system 100 can manage separate versions of the document for each user, replicating changes from one version to the other versions at each instance of the application 206 at the client devices 202. In such an embodiment, a user may retrieve the document and/or other information from the server 200 to modify at a client device 202. As the user modifies the document, the document management system 100 may periodically sync the document version at the client device 202 with the document version at the server 200. When the document version stored at the server 200 is updated, the document management system 100 can then sync each client device 202 with the server 200, such that other users may view the updated document.

In some embodiments, the document management system 100 can generate interactive timelines for different applications. In particular, the document management system 100 can communicate with a plurality of types of applications for producing timelines for more than one type of document. For instance, the document management system 100 can generate a first interactive timeline corresponding to a text document associated with a first application, and a second interactive timeline corresponding to a video document associated with a second application. In some implementations, the applications can be part of a group of related applications within a suite of applications. In other implementations, at least some of the applications can be unrelated applications created by different publishers.

In other embodiments, the document management system 100 allows users to access an instance of an application on the server 200. Specifically, the instance of the application may run on the server 200 rather than separate instances on each client device 202. A user editing a document with the application may access the instance of the application on the server 200 (e.g., via virtualization software) to view and/or modify the document stored on the server 200. Because the instance of the application is running on the server 200, the client device 202 corresponding to the user may not store any separate version of the document.

In an alternative embodiment, the document management system 100 can operate on a single device. In particular, a client device 202 can include all of the functionality associated with tracking changes to a document and presenting the changes in a document timeline. For example, the document management system 100 can be implemented as part of an application 206 running on a single client device 202. The application 206 may allow more than one user to access the document and/or a timeline associated with the document. In some embodiments, each instance of the application 206 on the client devices 202 can perform some or all of the operations of the document management system 100. A client device 202 can communicate with other client devices 202 running the application 206 via any method of communication for collaborative document editing.

As described previously, the document management system 100 can present an interactive timeline for a collaborative document. FIGS. 3A-3E illustrate various embodiments of a timeline interface 300 for a document. Although the timeline interface 300 is described in conjunction with the document management system 100 of FIG. 1, the timeline interface 300 may be used in conjunction with any document management system 100.

Figure 3A:
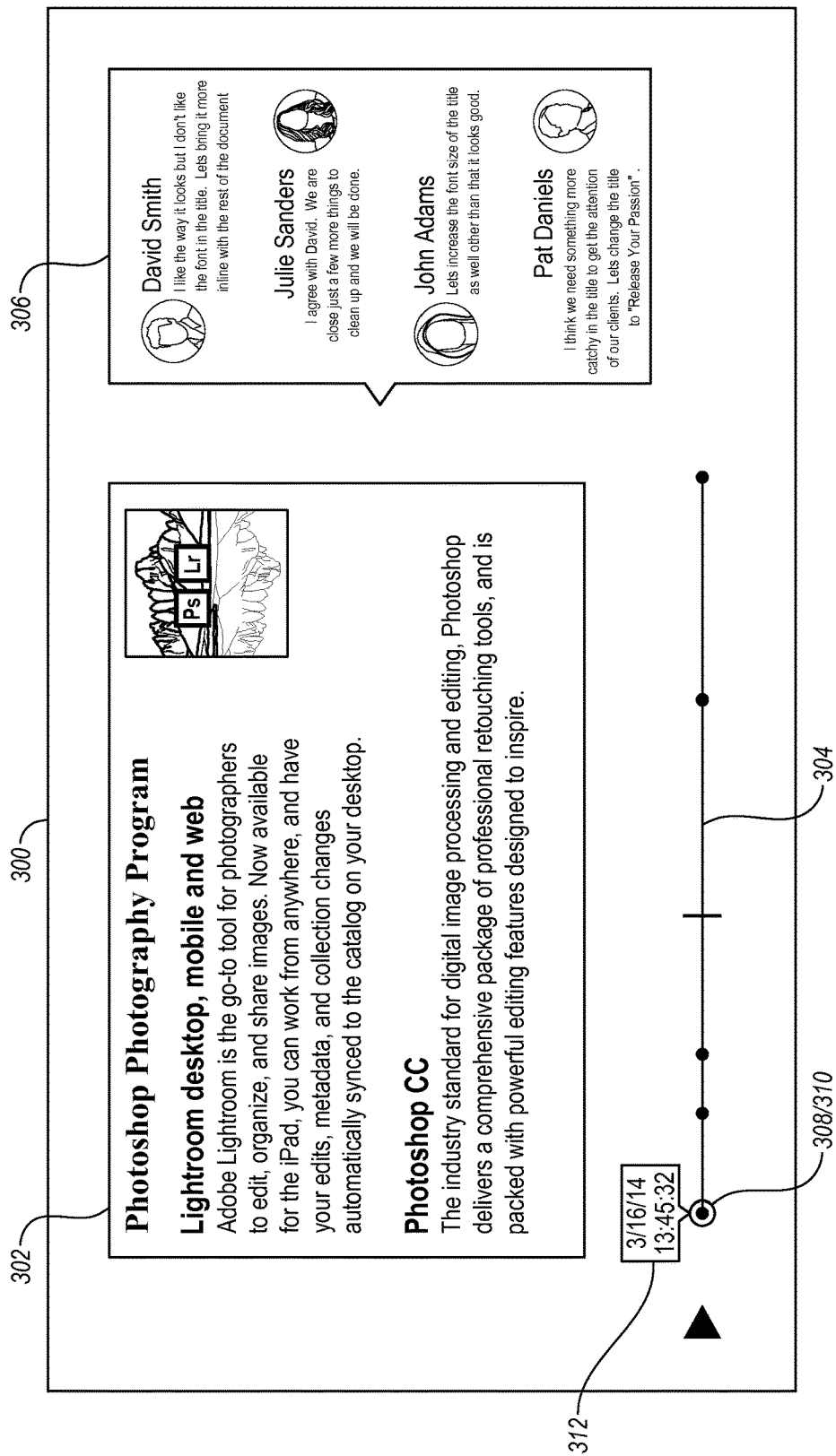
FIG. 3A-3E illustrate embodiments of a graphical user interface displaying a timeline interface in accordance with one or more embodiments.
Figure 3B:
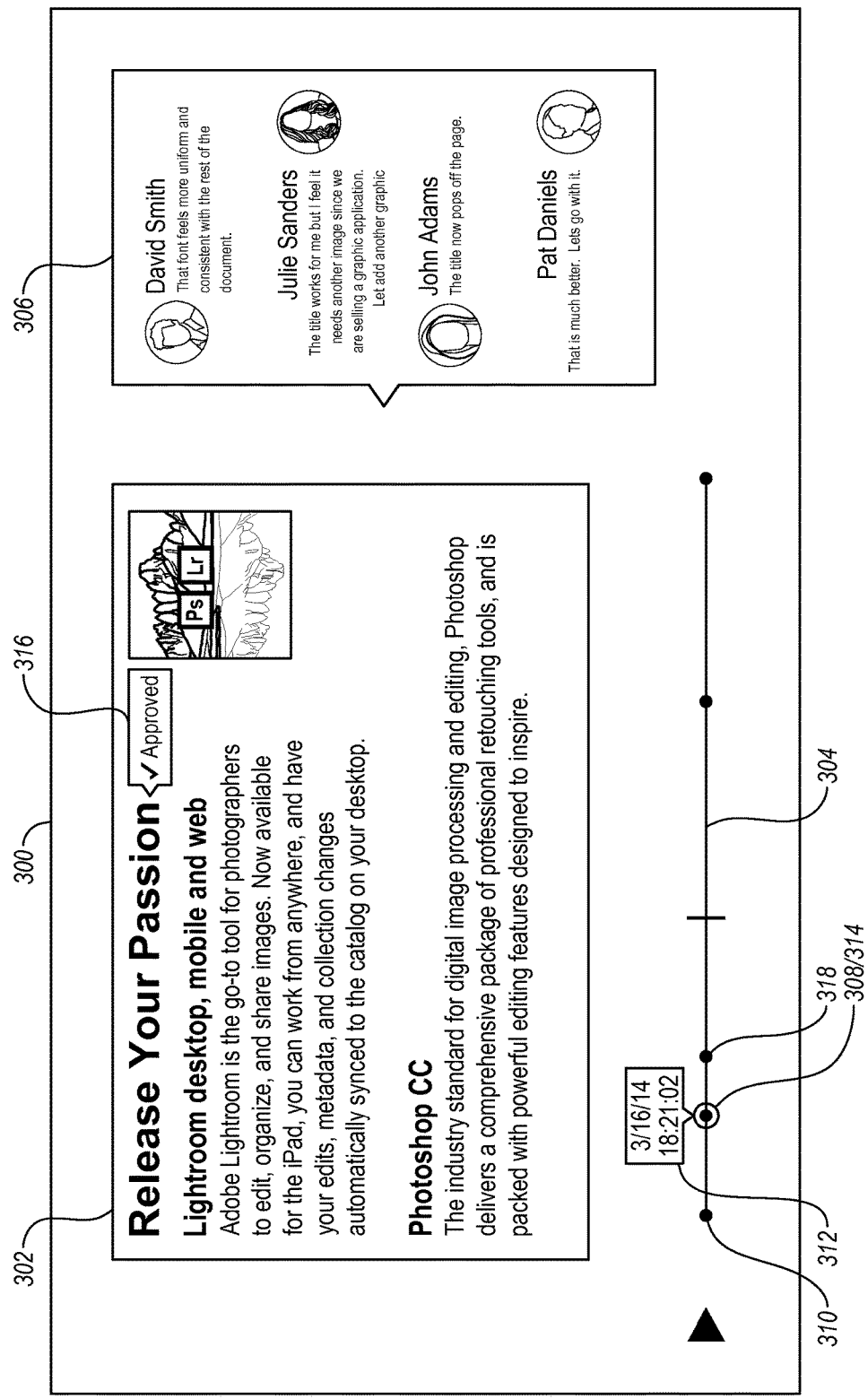

As shown by FIG. 3A, in one or more embodiments, the timeline interface 300 can include, but is not limited to, a document view area 302, a timeline 304, and a comment section 306. While the interface is depicted in FIGS. 3A-4 as having a particular layout of the components, the components of the timeline interface 300 can be organized within the timeline interface 300 in alternative configurations. For example, the timeline interface 300 can present some or all of the components organized according to a particular layout that allows users to view the document view area 302, timeline 304, and comment section 306 at the same time. Alternatively, the timeline interface 300 may present certain components in response to certain actions taken by a user when interacting with the timeline interface 300. In still further embodiments, a user can select or arrange the components of the timeline interface 300 as desired.

As mentioned, the timeline interface 300 can include a document view area 302. In one or more embodiments, the document view area 302 can facilitate the viewing and/or editing of a document. For example, the document view area 302 can display a state of the document at a given point in time. In some instances, the document may have a different state for each change made to the document. When a user makes a change to the document, the document management system 100 can store the change so that the state of the document for the corresponding change can be displayed in the document view area 302.

In other implementations, the document may have different states based on other criteria, such as a single state for a specific time period. In particular, the document management system 100 can store a state of the document after a specific amount of time has elapsed since the last state was stored. For example, the document management system 100 can store the state of the document every hour, every day, or after any predetermined amount of time. According to one or more embodiments, one or more users having access to the document can customize how frequently the document management system 100 stores a state of the document.

As described above, the timeline interface 300 can include a timeline 304. More specifically, the timeline 304 can facilitate viewing a document lifecycle or change history. For example, the timeline interface 300 can include a timeline 304 for viewing changes made to a particular document. The timeline 304 allows users to determine the changes that are shown in the timeline interface 300 for reviewing and/or collaborating with other users to edit the document.

The timeline 304 can include a control 308 that allows users to view the document at specific points in time. In particular, the user interface manager 106 can determine a state of the document to present to the user within the timeline interface 300 based on the position of the control 308 in the timeline 304. For example, the user can slide the control 308 along the timeline 304 to a position representing a particular state of the document at a particular time. Thus, changing the position of the control 308 in the timeline 304 can change the state of the document presented within the document view area 302.

In some implementations, the timeline 304 can include additional markers or points corresponding to the changes made to the document. The markers may be any visual indicators to represent a document change or a specific state of the document at a specific point in time within the timeline 304. For example, a marker may have any shape, including a circle, a polygon, a line, or any other type of marker that may be used to indicate a specific time on a timeline 304. In some embodiments, markers may have different shapes indicating different information in the timeline 304. According to one instance, a marker indicating a change to text in the document may have a first shape, and a marker indicating a change to an image in the document may have a second shape.

In some embodiments, the timeline 304 may represent changes, comments, approvals, rejections, or other notable points corresponding to the document using different characteristics for each type of data point. For example, different types of points can be represented in the timeline 304 by different colors. In one embodiment, the timeline 304 may present changes using a first color (e.g., red), comments using a second color (e.g., blue), approvals using a third color (e.g., yellow), and rejections using a third color (e.g., green). Although the example above describes certain data points being represented by different colors, the timeline 304 may represent any type of data point in the timeline 304 using any type of characteristic that allows a user to distinguish the data points on the timeline 304, such as different icons or other graphical elements.

The timeline interface 300 can also include a comment section 306 to facilitate collaborative creation or editing of documents. In particular, the comment section 306 can provide an area in the timeline interface 300 for users reviewing the document to communicate with each other. For example, comments made by users reviewing the document can be shown in the comment section 306 based on the position of the control 308 in the timeline 304. Comments for a particular state may be shown when the marker is on or near the position in the document view area 302 corresponding to the particular state. In alternative embodiments, the comments may be shown anywhere within the timeline interface 300.

In one or more embodiments, users can provide comments in the comment section 306 while viewing the document in the timeline interface 300. In particular, a user can enter a comment for a particular state of the document while viewing the state of the document in the interface timeline 304. For instance, when the position of the control 308 corresponds to the particular state of the document, the timeline interface 300 can present a text entry field in the comment section 306 to facilitate text input from a user. The user may comment on a particular feature shown in the state of the document in the document view area 302, and the comment can then be entered into the comment section 306 to present to other users.

Alternatively, the document management system 100 can allow users to enter comments while editing the document outside the timeline interface 300. In particular, an application 206 for editing the document can include an editing interface separate from the timeline interface 300. For example, the application 206 may only allow users to edit the document and make comments for the document in the editing interface, and not in the timeline interface 300. The timeline interface 300 may import the comments entered in the editing interface and display the imported comments in the comment section 306, for example, if the user inputs a selection to view the timeline interface 300 or each time a state of the document is stored.

According to one or more embodiments, the timeline interface 300 can provide reviewing tools. For example, the reviewing tools can include drawing tools, writing tools, highlighting tools, and/or other tools to facilitate review of the document and communication between reviewers. In one instance, the reviewing tools can allow users to highlight features or elements in the document view area 302 for a particular state of the document. In some embodiments, a user may use the reviewing tools to illustrate a particular concept that is difficult to describe only in words. Additionally or alternatively, the reviewing tools can allow users to create notes for personal use later on in the reviewing/editing process.

In some embodiments, the users can comment on highlighted elements and associate the comments with the highlighted elements using the reviewing tools. In particular, the timeline interface 300 can highlight or visually associate comments with a particular highlighted element. For example, the timeline interface 300 can highlight a comment and a particular element at the same time or using the same color. In another example, the highlight can mark the highlighted element with an identifier associated with the particular comment (e.g., a name or a comment number). Highlighting a comment and an element may indicate that the element was approved based on the comment.

In some embodiments, the timeline interface 300 allows users to interact with the state of the document as presented in the document view area 302. For example, if the document is a text document, the timeline interface 300 may include at least some word processing capabilities to allow the user to modify text within the document. Similarly, if the document includes images, the timeline interface 300 may allow users to modify content or position of images within the document. In some implementations, the timeline interface 300 only allows users to make changes to the document within the document view area 302 for the most recent state of the document. In other implementations, the timeline interface 300 allows users to make changes to any state of the document presented within the document view area 302.

If the document is altered within the document view area 302 of the timeline interface 300, the document management system 100 can store the corresponding changes and modify the timeline interface 300 accordingly. For example, the document management system 100 can add a new marker to the timeline 304 to indicate that a new change has been made. Additionally, the document management system 100 can store a new state of the document corresponding to the changes made within the document view area 302 in connection with the new marker on the timeline 304. The timeline interface 300 can automatically reposition the marker indicating the current position in the timeline 304 to the location corresponding to the state saved in response to the changes made within the timeline interface 300. In one instance, if changes are made to the document within the timeline interface 300, the changes are saved for a state of the document corresponding to an end point on the timeline 304 to indicate that the state of the document is the most recent state.

In some embodiments, the timeline interface 300 may not allow users to make changes to the document within the timeline interface 300. Specifically, the timeline interface 300 may only allow users to view the changes, comment on the changes, or make notes in the document view area 302 without modifying the document itself. For example, comments and notes made within the timeline interface 300 may only be visible from within the timeline interface 300 and are not stored as part of the document. If a user wants to make changes to the document, the user make changes to the document from within the corresponding application 206. After making changes, the user can access the timeline interface 300, and the changes may be reflected in the timeline interface 300.

In one or more embodiments, as shown in FIG. 3A, the document view area 302 presents a first state of the document corresponding to a first position in the timeline 304. In particular, the timeline interface 300 can present the first state of the document when the control 308 is positioned at the beginning of the timeline 304, as represented by a first marker 310 at the beginning of the timeline 304. In one example, the first state of the document presented in the timeline interface 300 may correspond to a first draft of a document. In another example, the first state of the document may correspond to the document after first being loaded by the application 206.

In one embodiment, the timeline interface 300 presents a time indicator 312 to indicate the time corresponding to the position of the control 308 in the timeline 304. In particular, the time indicator 312 can indicate the time corresponding to the state of the document shown in the document view area 302. For example, the time indicator 312 can show a date at which the state of the document was saved. In some embodiments, if the timeline 304 includes multiple states of the document corresponding to the same day, the time indicator 312 can also indicate the time of day, as shown in FIGS. 3A-3B. In alternative embodiments, a user viewing the timeline 304 can customize the information displayed in the time indicator 312.

According to various implementations, the timeline interface 300 can present the comments according to the order in which the comments are received for the corresponding state of the document. For example, when a document is first created or loaded into an application for review, one or more users may provide comments or ask questions related to content in the document. When the state of the document at that time is presented in the timeline interface 300, the corresponding comments can be presented in the comment section 306 according to the order in which the comments were received from the other users. Similarly, if users are able to enter comments into the timeline interface 300 for a particular state of the document, as described previously, the timeline interface 300 can present the comments in the order that the comments are entered. In alternative embodiments, a user may be able to configure the order in which the comments are presented within the comment section 306.

As mentioned, moving the control 308 in the timeline 304 allows the user to view multiple states of the document based on the position of the control 308. FIG. 3B illustrates the interactive timeline 304 presenting a second state of the document. The document view area 302 presents the second state of the document based on the position of the control 308 at a second marker 314 in the timeline 304. The second state of the document may include changes made to the document based on comments corresponding to the first state of the document.

In additional embodiments, the comment section 306 can present comments for the second state of the document based on the position of the control 308 at the second marker 314 in the timeline 304. In particular, as control 308 slides from the first marker 310 to the second marker 314, the comment section 306 can be updated to include the comments corresponding to the second state of the document. For example, user comments discussing the first state of the document are displayed in conjunction with the first state of the document, and user comments discussing the second state of the document are displayed in conjunction with the second state of the document. Thus, the user can view the relevant comments for the corresponding states of the document and changes to the document.

In one or more embodiments, users reviewing the document can approve or reject changes to the document. The timeline interface 300 can present an indicator of the approval or rejection of the changes to the document. In one instance, the document management system 100 can receive input from the one or more users to approve or reject the changes to the document from within the timeline interface 300.

In one or more implementations, a user can approve or reject individual elements shown in the document view area 302. In particular, the user can approve or reject an individual element of the state of the document within the document view area 302. For example, the user can select an element in the document view area 302 (e.g., by clicking or tapping on the element) and approve the element by selecting an option to approve the element. Similarly, the user can select the element and reject the element by selecting an option to reject the element. Selecting elements may cause the timeline interface 300 to highlight the elements using a particular color (e.g., yellow) or other indicator to allow the user to easily determine that the correct elements are selected.

In some embodiments, the timeline interface 300 can include a voting mechanism for voting whether to approve or reject a particular change. For example, the voting mechanism can poll users reviewing the document to determine whether to approve the change. If the poll receives a number of votes exceeding a threshold (e.g., a majority), document management system 100 can approve the change. Alternatively, a single user may have approval rights for determine whether any of the changes to the document are approved. For example, a document manager or document owner can determine whether a change should be approved.

In various embodiments, the elements can be individual content items in the document view area 302. For example, the elements can include an image, a word, a sentence, a paragraph, a video, an indicator of an audio file, and/or any other type of content that may be included in a document. In other instances, the elements can include more than one content item in a document, such as a multiple groups of text, multiple images, etc.

As shown in FIG. 3B, one or more users may approve an element within the second state of the document shown in the document view area 302. For example, when the one or more users determine that the element does not need additional changes, and no more editing is necessary, the one or more users may choose an option to approve the element. When the one or more users approve the element, the timeline interface 300 may display an indication 316 of the approval of the element in the document view area 302. Alternatively, the timeline interface 300 may present the indication 316 of the approval of the element elsewhere in the timeline interface 300—for example, in a list of approved elements.

In some embodiments, the indication 316 of the approval may include any indicator. In particular, the indication 316 of the approval may provide any visual indication to users reviewing the document in the timeline interface 300 that a change has been approved. For example, the indication 316 of the approval may include an icon or text on or near the approved element. In one or more embodiments, the icon may include a text box such as, "Approved" with a checkmark, as illustrated in FIG. 3B.

In an alternative example, the indication 316 of the approval may include highlighting the approved element. For instance, the timeline interface 300 can surround an approved image with a border having a particular color (e.g., green) indicating that the image is approved. In another instance, the timeline interface 300 can change the color of approved text indicating that the text is approved. In yet other examples, the elements may be highlighted in any way that allows users to easily and quickly determine that the elements have been approved. Similarly, the timeline interface 300 can highlight rejected elements having a particular color (e.g., red) indicating that the elements are rejected.

In one or more embodiments, the indication 316 of the approval of a particular element can remain on the timeline interface 300 until the final approval of the document as a whole. Thus, users may be able to easily determine that each element has been approved before approving the document as a whole. If additional changes are made to the elements, or if the approval is revoked, the indication 316 of the approval may be removed from one or more of the states of the document. For example, the indication 316 of the approval may be removed from all of the states of the document, or just from the states of the document after a user changes the element or revokes the approval.

In alternative embodiments, the indication 316 of the approval may be shown only on the state of the document corresponding to the time at which the approval is made, such that the indication 316 of the approval does not remain in the document view area 302 for other states of the document. In some instances, a document may contain many elements, each needing approval, such that indications of approval for each element may overlap other elements or content in the document. Consequently, showing the indication 316 of approval for each element only for the state of the document corresponding to the time at which the approval is made may provide a cleaner, uncluttered view of subsequent states of the document.

Figure 3C:
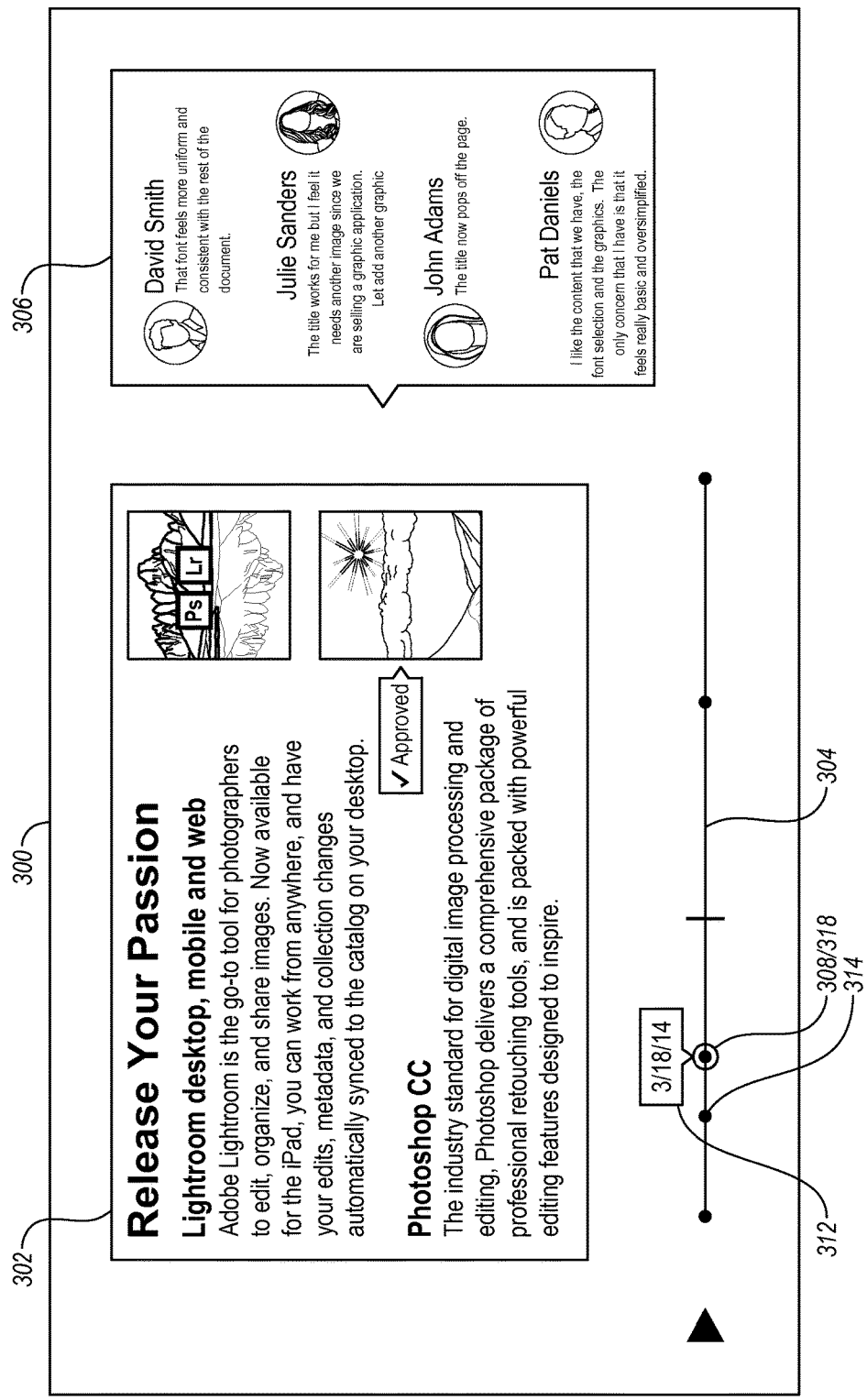
Figure 4:
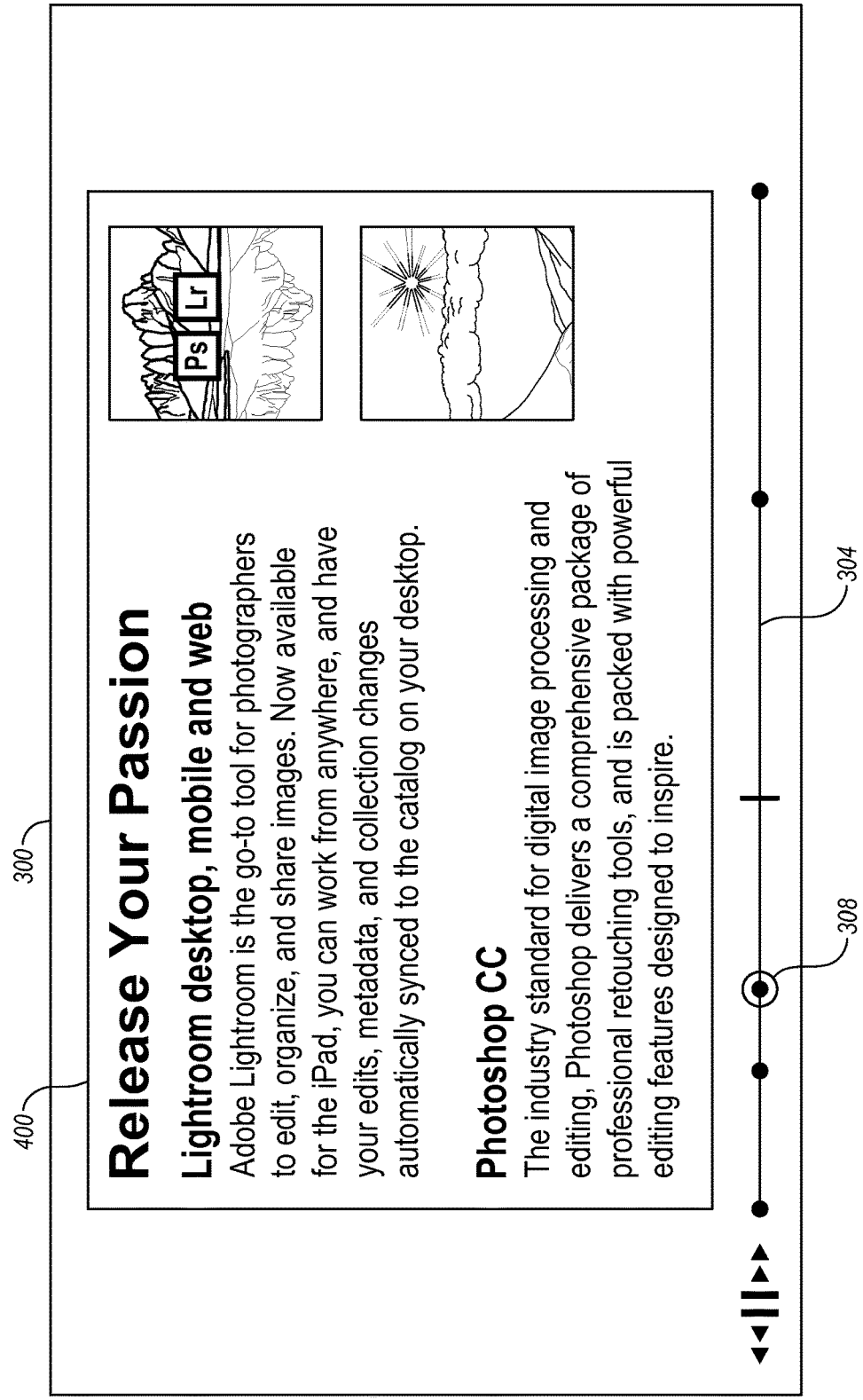
FIG. 4 illustrates an embodiment of a graphical user interface displaying a time-lapse video for a timeline interface in accordance with one or more embodiments.

When the user slides the movable element from the second marker 314, as shown in FIG. 3B, to a third marker 318, as shown in FIG. 3C, the timeline interface 300 updates accordingly. For example, the timeline interface 300 can present the third state of the document in the document view area 302. Additionally, the timeline interface 300 can also update the comment section 306 to display comments corresponding to the third state of the document.

When the document view area 302 is updated, the date shown in connection with the control 308 on the timeline 304 can also change. In some embodiments, the format of the date may also change, as described previously. For example, if the state of the document corresponds to a date on which multiple changes are made, the date may be presented with a time stamp for the change associated with the state of the document. Alternatively, if the state of the document corresponds to a date on which only one change was made, the date alone may be presented. In other embodiments, the timeline interface 300 may present only a time stamp or other time for the control 308.

As previously mentioned, users can approve individual content items. FIG. 3C illustrates an indication 316 of an approval for an image in the document. In particular, the timeline interface 300 can present the indication 316 of the approval for the content item within the document view area 302 after one or more users approve the element. In some instances, users can approve more than one element in the timeline interface 300 for a single state of the document, such that the document view area 302 may include more than one indication 316 of an approval.

Figure 3D:
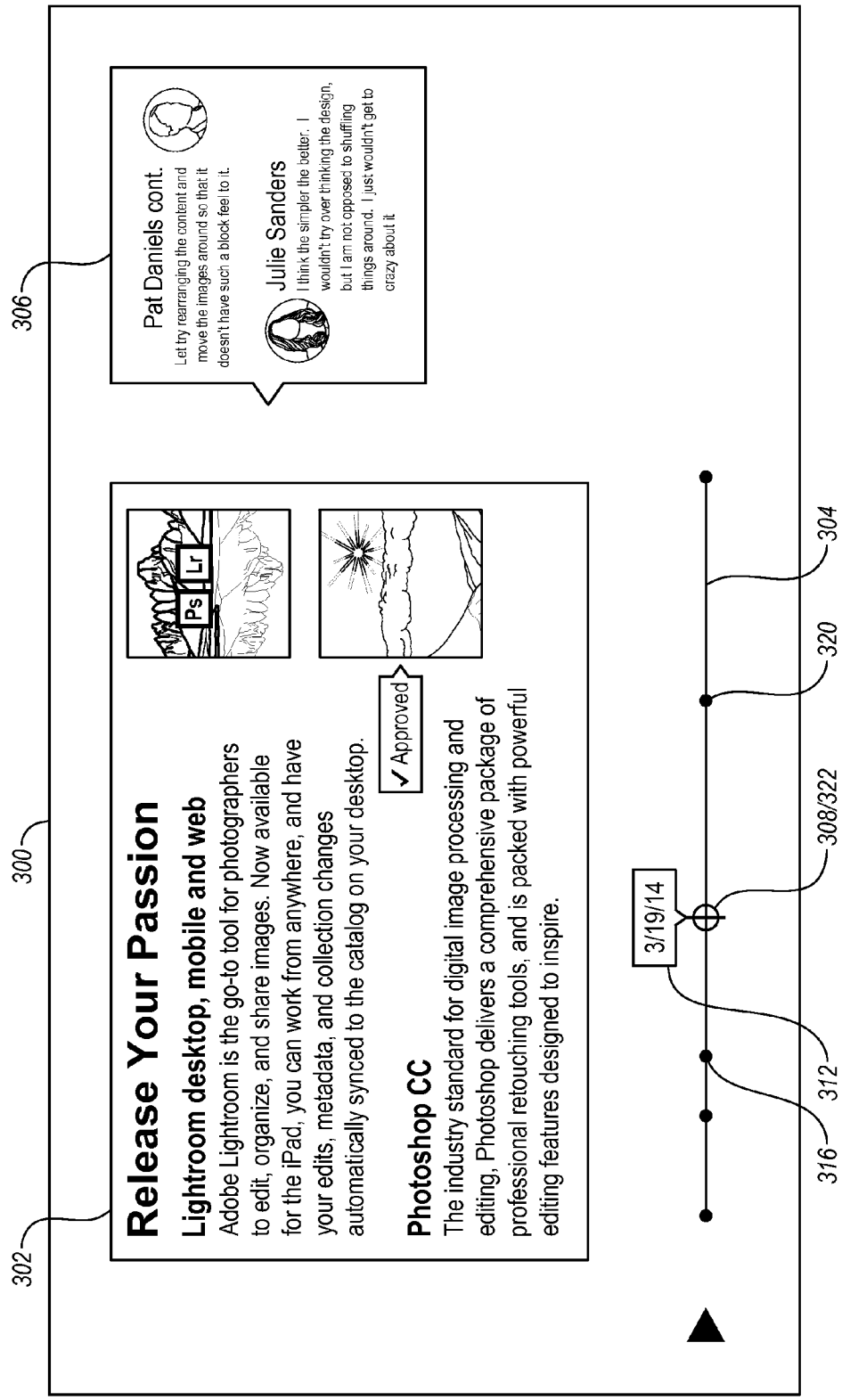

The comments associated with a particular state of the document presented in the document view area 302 may not fit in the comment section 306 of the timeline interface 300 due to the length or number of comments associated with the particular state of the document. For example, a comment may only be partially shown in the comment section 306 before a border of the comment section 306 cuts off the comment. The timeline interface 300 may allow users to scroll through or otherwise view the additional comments associated with the state of the document, as illustrated in FIG. 3D. Additionally or alternatively, the size of the comment section 306 may be altered according to the length/number of comments.

In one or more embodiments, the user can scroll through the comments associated with a state of the document using the control 308 in the timeline 304. In particular, the user may slide or scrub the control 308 along the timeline 304 between two markers associated with different states of the document. For example, the user can slide the control 308 between the third marker 318 associated with the third state of the document and a fourth marker 320 associated with a fourth state of the document. When the control 308 reaches the fourth marker 320, the document view area 302 may change to display the fourth state of the document, and the comment section 306 may display the comments associated with the fourth state of the document.

In one or more embodiments, the user can slide the control 308 to a comment marker 322 representing one or more comments that were made for the third state of the document. For example, the comments may have been made after a certain amount of time has passed since the last changes were made to the document. Alternatively, the comment marker 322 may indicate that the comments for the third state of the document do not all fit in the comment section 306. In other embodiments, the comment marker 322 may indicate other properties of the corresponding comments—for example, the comments are not associated with any particular state of the document, but refer to the document as a whole.

Additionally, the rate at which the timeline interface 300 may scroll through the comments may be determined by the distance between the markers and the number or length of comments in the comment section 306. Alternatively, the rate at which the timeline interface 300 scrolls through the comments may be fixed. In another alternative embodiment, the user may customize the rate at which the comments are scrolled.

Additionally or alternatively, the user may scroll through the comments for a particular state of the document using a scroll bar (not shown) in the comment section 306 of the timeline interface 300. This may allow the user to control the comment section 306 only without affecting the timeline control 308 or document view area 302. Separate controls for the timeline 304 and the comment section 306 may also allow the control 308 to snap to the markers in the timeline 304, rather than freely moving along the timeline 304.

Figure 3E:
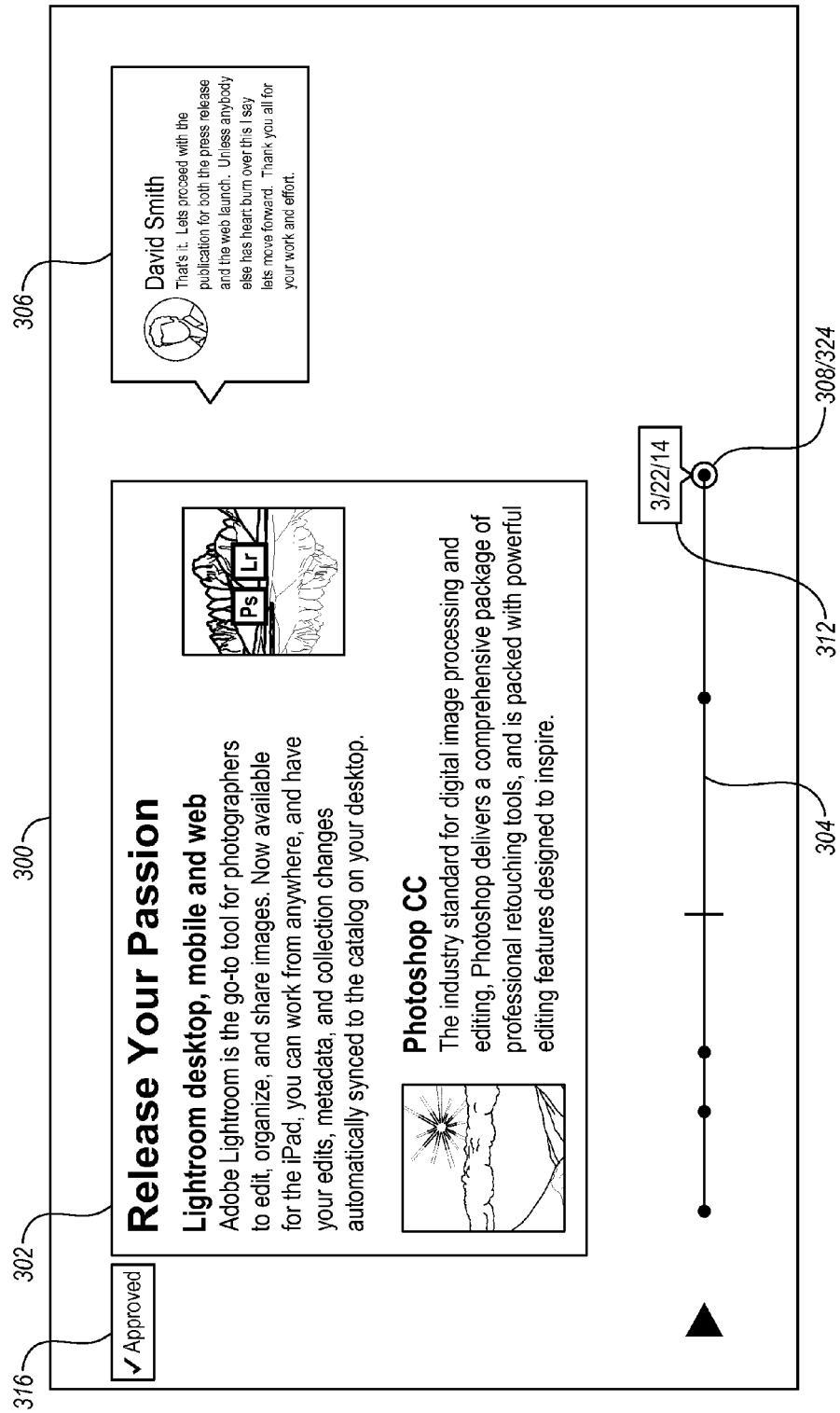

In one or more embodiments, the document management system 100 may allow one or more users to approve the entire document. FIG. 3E illustrates an embodiment of the timeline interface 300 in which the document as a whole is approved. In particular, one or more users may determine that a document is completed, such that no more editing is necessary, and may choose an option to approve the entire document. When the one or more users approve the document, the timeline interface 300 may display an indication 316 of the approval of the document in the document view area 302 or elsewhere in the timeline interface 300.

In one embodiments, when the document as a whole is approved, the indication 316 of the approval for the document as a whole may be presented in connection with the final state of the document. The final state of the document may correspond to a final marker 324 on the timeline 304. The timeline interface 300 may display any comments associated with the final state of the document in the comment section 306. The timeline interface 300 may also display the date of the final state of the document.

In one or more embodiments, the timeline interface 300 may present a time-lapse video of the changes made to the document. FIG. 4 illustrates an embodiment of the timeline interface 300 presenting a time-lapse video 400 of changes to a document. In particular, the timeline interface 300 allows a user to play a time-lapse video 400 that has been generated for the document. For example, the user may press a play button that starts the time-lapse video 400 from the beginning of the timeline 304 and steps through the changes made to the document until a present time or a time corresponding to the last change made to the document.

The time-lapse video 400 may provide information to the user to allow the user to easily see the changes made to the document. For example, the time-lapse video 400 may highlight altered elements in the document using colors or lighting effects (e.g., highlighting the changed elements or an area surrounding the changed elements). In some embodiments, the time-lapse video 400 may include comments or snapshots of comments associated with the changes.

In some embodiments, the document management system 100 can generate a time-lapse video 400 when the timeline interface 300 is opened. When a user opens the timeline interface 300 from an application, or opens the application starting at the timeline interface 300, the user may play the already generated time-lapse video 400 at any time. Generating the timeline 304 before the timeline interface 300 opens or in response to the user opening the timeline interface 300 may reduce latency when the user plays the time-lapse video—particularly if the time-lapse video 400 includes visual effects such as transition effects or other effects. Alternatively, the document management system 100 may generate the time-lapse video 400 at any time.

The timeline interface 300 may include video controls 402 to manipulate the playback of the video 400. For example, the video controls 402 may include pause, fast-forward, reverse, or other controls to determine how the video 400 plays within the timeline interface 300. The video controls 402 may also include other controls for producing effects within the video 400, including lighting effects, transition effects between states of the document or changes made to the document, and/or other modifications to the video 400. Additionally, the user may use the timeline control 308 to manipulate the playback of the time-lapse video 400.

In one or more implementations, the document management system 100 may allow the user to share the time-lapse video. In particular, the user may share the time-lapse video with other reviewers or other people who may be interested in the video. For example, the timeline interface 300 may include an option to share the video via a social-networking site, a mobile application, the application used to edit the document, or any other method of sharing digital content.

FIGS. 1-4, the corresponding text, and the examples, provide a number of different systems and devices for managing documents. In addition to the foregoing, embodiments of the present invention also can be described in terms of flowcharts comprising acts and steps in a method for accomplishing a particular result. For example, FIGS. 5 and 6 illustrate flowcharts of exemplary methods in accordance with one or more embodiments of the present invention.

Figure 5:
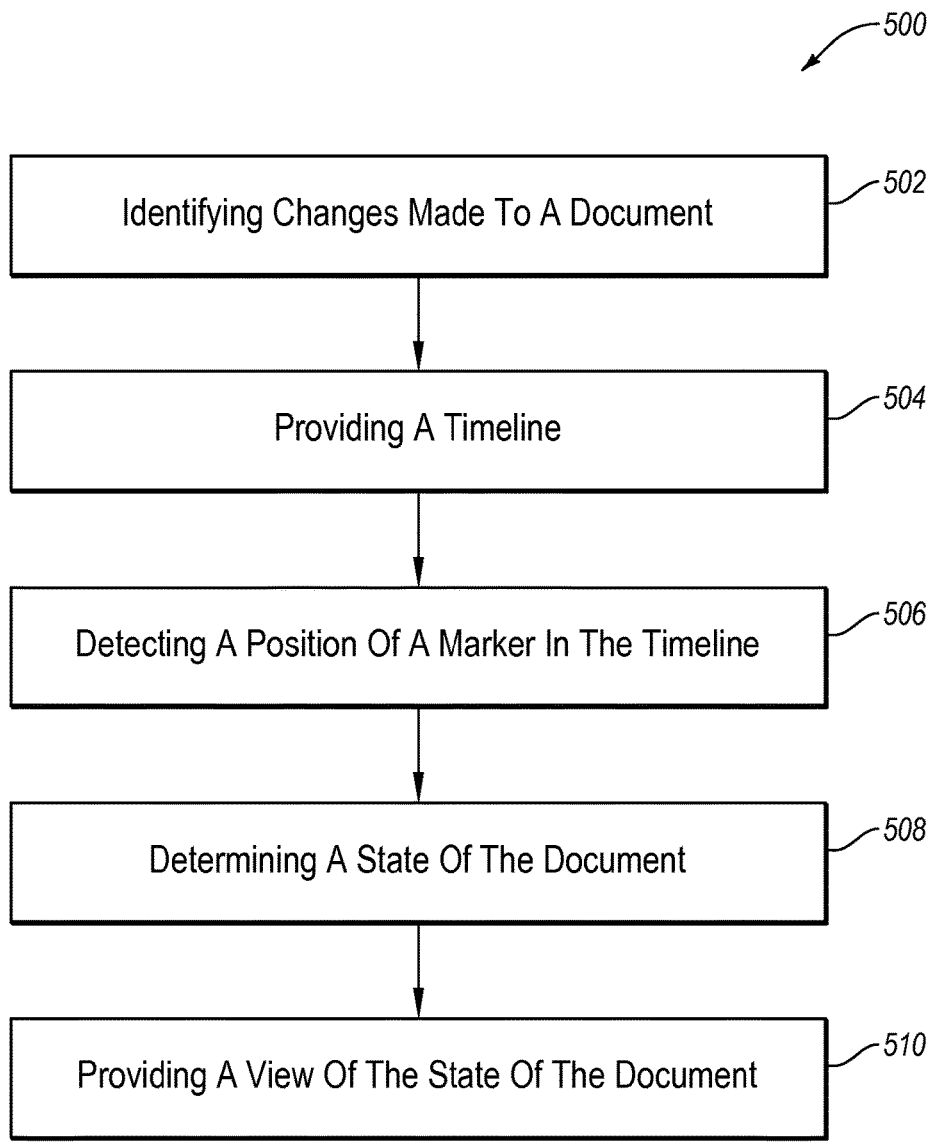
FIG. 5 illustrates a flowchart of a series of acts in a method of tracking document changes in accordance with one or more embodiments.
Figure 6:
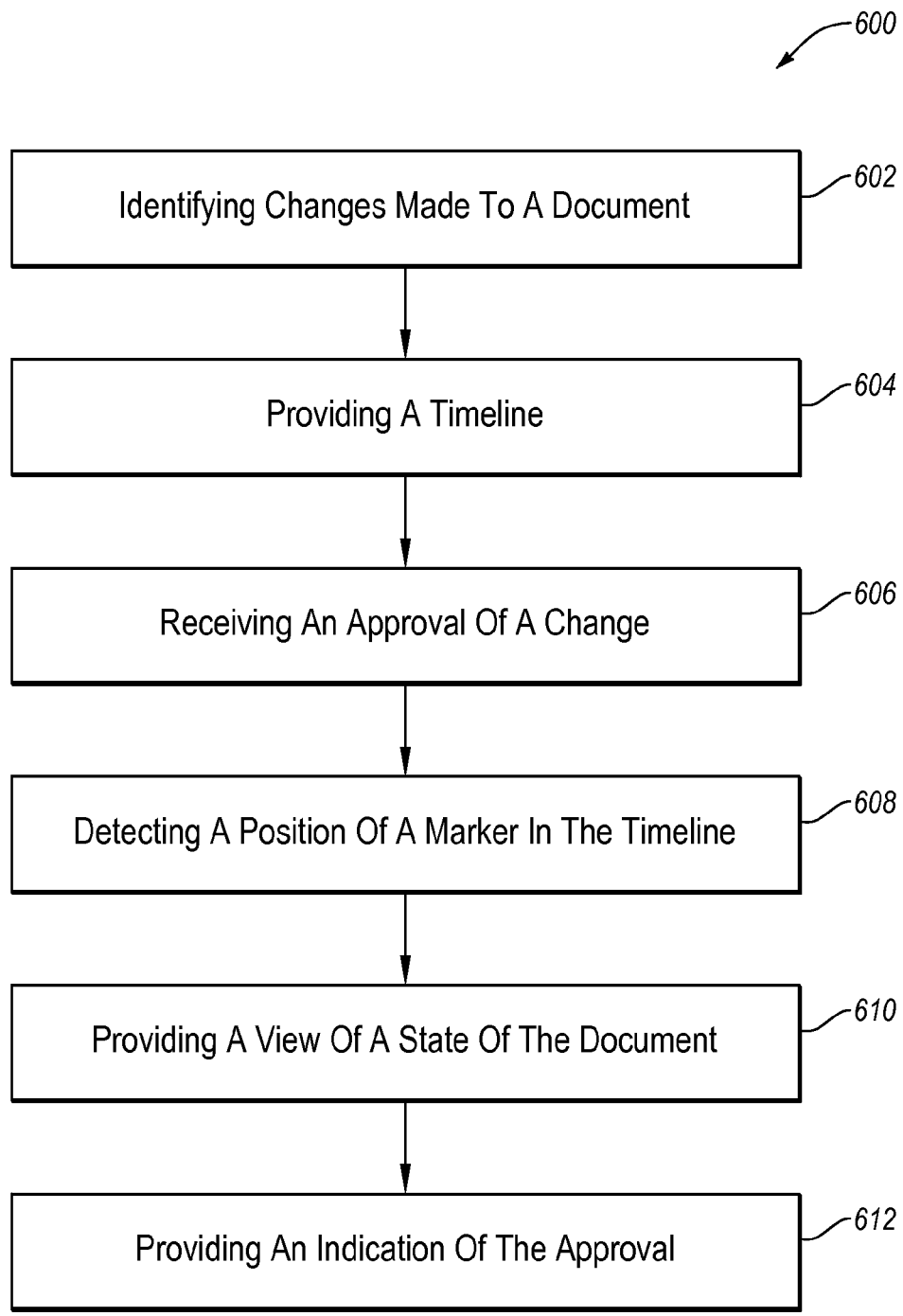
FIG. 6 illustrates a flowchart of a series of acts in a method of tracking document changes in accordance with one or more embodiments.

FIG. 5 illustrates a flowchart of a series of acts in a method of presenting document changes. The method 500 includes an act 502 of identifying changes made to a document. For example, act 502 can involve identifying changes to text, images, video, audio, or other content in a document. In one or more embodiments, act 502 involves tracking changes to a document. Alternatively, act 502 can involve receiving notifications of changes or changes themselves from an application 206 running on a client device 202.

As part of act 502, or as an additional act, the method 500 can include detecting a change to the document and receive an approval of the change from at least one of a plurality of users having access to the document. In one example, the method 500 can include presenting an indication 316 of the approval within the graphical user interface. Presenting the indication 316 of the approval can involve presenting an icon in connection with a selected element that indicates that the selected element is approved. Alternatively, presenting the indication 316 of the approval can involve presenting an icon indicating approval of the document as a whole.

The method 500 also includes an act 504 of providing a timeline 304. In particular, act 504 involves providing, within the graphical user interface, an interactive timeline 304 comprising a control 308 for navigating the changes made to the document. For example, the timeline 304 can be a timeline bar that allows a user to move a slider along the timeline bar to view the changes made to the document.

As part of act 504, or as an additional act, the method 500 can include providing, in the interactive timeline 304, a first marker 310 indicating a change to the document. The method 500 can also include providing, in the interactive timeline 304, a second marker 322 indicating a comment associated with the change, wherein the second marker 322 differs in appearance from the first marker 310. For example, the first marker 310 can include a first color and the second marker 322 can include a second color.

Additionally, the method 500 includes an act 506 of detecting a position of a control 308 in the timeline 304. Specifically, act 506 involves detecting a position of the control 308 in the interactive timeline 304. For instance, the position of the control 308 can be detected relative to a plurality of markers in the interactive timeline 304. The markers may indicate various highlighted events or changes associated with the document.

In one or more embodiments, the method 500 includes an act 508 of determining a state of the document. More specifically, act 508 involves determining, by at least one processor, a state of the document at a time corresponding to the position of the control 308. For example, act 508 can involve identifying the time corresponding to the position of the control 308 and retrieving the state of the document corresponding to the time.

In addition, the method 500 includes an act 510 of providing a view of the state of the document. In particular, act 510 involves providing, within the graphical user interface, a view of the state of the document at the time corresponding to the position of the movable marker. For example, act 510 can involve presenting the version of the document in which a particular change is saved. Alternatively, act 510 can involve presenting an original version of the document and overlaying saved changes on top of the original version of the document.

As part of act 510, or as an additional act, the method 500 can include presenting, within the graphical user interface, a user comment corresponding to the state of the document at the time corresponding to the state of the document. Additionally, the method 500 can include providing, in the interactive timeline 304, a marker corresponding to each change made to the document. The method 500 can also include providing, in the interactive timeline 304, a marker corresponding to each approval of a change made to the document.

The method 500 can also include generating a time-lapse video comprising changes made to the document in chronological order. The method 500 can include receiving a selection to play the time-lapse video, and presenting the time-lapse vide in the graphical user interface in response to the selection to play the time-lapse video.

FIG. 6 illustrates a flowchart of a series of acts in a method of presenting document changes. The method 600 includes an act 602 of identifying changes made to a document. For example, act 602 can involve identifying changes to text, images, video, audio, or other content in a document. In one or more embodiments, act 602 involves tracking changes to a document. Alternatively, act 602 can involve receiving notifications of changes or changes themselves from an application 206 running on a client device 202.

The method 600 also includes an act 604 of providing a timeline 304. In particular, act 604 involves providing, within the graphical user interface, an interactive timeline 304 comprising a control 308 for navigating the changes made to the document. For example, the interactive timeline 304 can be a timeline bar that includes a slider for moving along the timeline bar to view the changes made to the document.

As part of act 604, or as an additional act, the method 600 can include an act of detecting a reposition of the control 308 in the interactive timeline 304 from the first position to a second position. The method 600 can also include an act of presenting, within the graphical user interface, a view of a second state of the document at a second time corresponding to the second position of the control 308 in the interactive timeline 304.

The method 600 also includes an act 606 of receiving an approval of a change. In particular, act 606 involves receiving an approval of a particular change to the document. For example, one or more users can vote to approve the particular change to the document. Alternatively, a single user may have approval rights to approve the particular change.

Additionally, the method 600 includes an act 608 of detecting a position of a control 308 in the timeline 304. Specifically, act 608 involves detecting, by at least one processor, a first position of the movable marker in the interactive timeline 304, wherein the first position corresponds to a state of the document at a time of the particular change.

In one or more embodiments, the method 600 includes an act 610 of providing a view of a state of the document. More specifically, act 610 involves providing, within the graphical user interface, a view of the state of the document at the time of the particular change. As part of act 610, or as an additional act, the method 600 can include an act of providing, within the graphical user interface, a user comment corresponding to the state of the document at the time associated with the state of the document.

In addition, the method 600 includes an act 612 of providing an indication 316 of the approval. In particular, act 612 involves providing, within the graphical user interface, an indication 316 of the approval in the view of the state of the document. For example, act 612 can involve providing an approval icon for the particular change. Alternatively, act 612 can involve highlighting the particular change.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

One or more embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
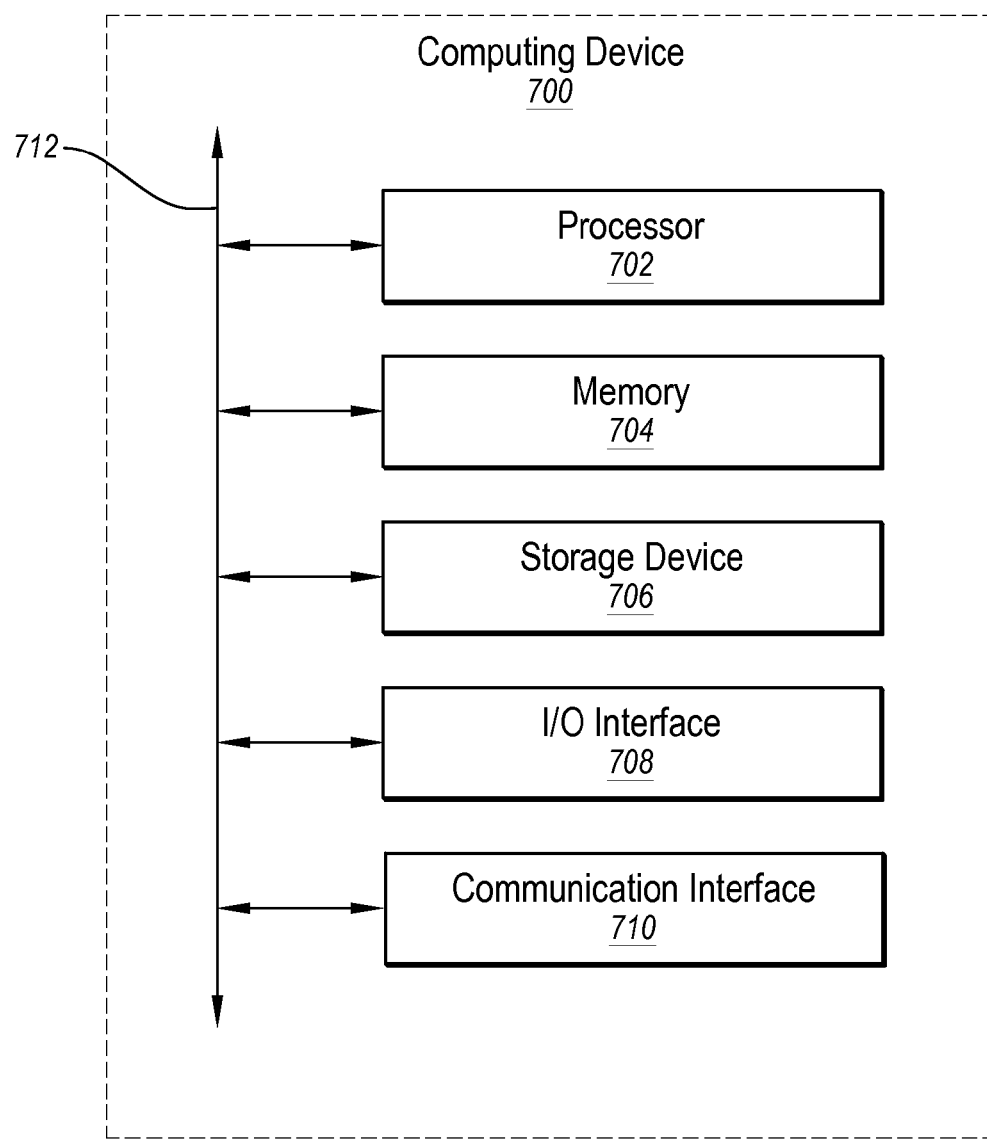
FIG. 7 illustrates a block diagram of an exemplary computing device in accordance with one or more embodiments of the present invention.

FIG. 7 illustrates a block diagram of an exemplary computing device that may be configured to perform one or more of the processes described above. One will appreciate that the client device 202 and/or the server 200 can comprise implementations of the computing device 700. As shown by FIG. 7, the computing device can comprise a processor 702, memory 704, a storage device 706, an I/O interface 708, and a communication interface 710. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor(s) 702 includes hardware for executing instructions, such as those making up a computer program. As an example and not by way of limitation, to execute instructions, processor(s) 702 may retrieve (or fetch) the instructions from an internal register, an internal cache, memory 704, or a storage device 706 and decode and execute them. In particular embodiments, processor(s) 702 may include one or more internal caches for data, instructions, or addresses. As an example and not by way of limitation, processor(s) 702 may include one or more instruction caches, one or more data caches, and one or more translation lookaside buffers (TLBs). Instructions in the instruction caches may be copies of instructions in memory 704 or storage 706.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The computing device 700 includes a storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In particular embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 700 also includes one or more input or output ("I/O") devices/interfaces 708, which are provided to allow a user to provide input to (such as user strokes), receive output from, and otherwise transfer data to and from the computing device 700. These I/O devices/interfaces 708 may include a mouse, keypad or a keyboard, a touch screen, camera, optical scanner, network interface, modem, other known I/O devices or a combination of such I/O devices/interfaces 708. The touch screen may be activated with a stylus or a finger.

The I/O devices/interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 710. As an example and not by way of limitation, computing device 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 700 may include any suitable communication interface 710 for any of these networks, where appropriate.

The computing device 700 can further include a bus 712. The bus 712 can comprise hardware, software, or both that couples components of computing device 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method of presenting document changes, comprising:
identifying changes made to content within a document;
providing, within a graphical user interface, a timeline interface comprising an interactive timeline representing a chronological order of a plurality of states of the document corresponding to the changes made to the content within the document, the interactive timeline comprising a control and one or more markers indicating a change to the document;
detecting, via positioning of the control, a selection of a marker of the one or more markers;

determining, by at least one processor, a state of the document of the plurality of states of the document and one or more changes of the changes made to the content within the document for a time corresponding to a position of the control at the marker;

providing, within the timeline interface, a view of the state of the document at the time corresponding to the position of the control by overlaying the one or more changes for the time corresponding to the position of the control on an original version of the document;

receiving, within the timeline interface, a user input requesting to add a new change to the content within the document at the time corresponding to the position of the control in the interactive timeline;

modifying, in response to the received user input within the timeline interface, the document to include the new change to the content within the timeline interface;

adding a new state of the document to the interactive timeline, the new state comprising a version of the document including the new change to the content according to the user input; and repositioning, in response to the adding the new state of the document to the interactive timeline based on the received user input within the timeline interface, the position of the control to a location corresponding to the new state within the interactive timeline.

2. The method as recited in claim 1, wherein determining the state of the document at the time corresponding to the position of the control comprises:

identifying the time corresponding to the position of the control; and retrieving the state of the document and the one or more changes corresponding to the time.

3. The method as recited in claim 1, further comprising:

receiving, in connection with a change to content within the document, a plurality of votes from a plurality of reviewers of the document to reject or approve the change to the content within the document;

determining that the plurality of votes to approve the change to the content within the document meets a threshold; and providing, within the timeline interface, an indication of approval of the change in the view of the state of the document.

4. The method as recited in claim 3, further comprising:

receiving a selection of an element from a plurality of elements in the document;

receiving approval of the selected element separately from other elements from the plurality of elements in the document; and providing the indication of the approval by presenting an icon in connection with the selected element from the plurality of elements that indicates that the selected element is approved.

5. The method as recited in claim 1, further comprising:

providing, in the interactive timeline, a first marker indicating a change to content within the document; and providing, in the interactive timeline, a second marker indicating a comment associated with the change associated with the first marker, wherein the second marker differs in appearance from the first marker.

6. The method as recited in claim 5, wherein the first marker comprises a first shape and the second marker comprises a second shape.

7. The method as recited in claim 1, further comprising:

generating a time-lapse video comprising changes made to content within the document in chronological order;

receiving a selection to play the time-lapse video; and presenting the time-lapse video in the graphical user interface in response to the selection to play the time-lapse video.

8. The method as recited in claim 1, wherein adding the new state of the document to the interactive timeline comprises:

adding the new state to an end of the interactive timeline; and adding a marker to the end of the interactive timeline corresponding to the new state.

9. The method as recited in claim 1, further comprising providing, in the interactive timeline, a second marker corresponding to the new state of the document comprising the changed content.

10. The method as recited in claim 1, wherein the received user input within the timeline interface comprises a user input requesting to change text, an image, a video, or audio image within the document.

11. A non-transitory computer readable storage medium comprising instructions that, when executed by at least one processor, cause a computer system to:

identify changes made to content within a document;

provide, within a graphical user interface, a timeline interface comprising an interactive timeline representing a chronological order of a plurality of states of the document corresponding to the changes made to the content within the document, the interactive timeline comprising a control and one or more markers indicating a change to the document;

detect, via a first position of the control, a selection of a marker of the one or more markers, wherein the first position corresponds to a state of the document at a time of a particular change;

present, within the timeline interface, a view of the state of the document of the plurality of states of the document at the time of the particular change by overlaying the particular change on an original version of the document;

receive, within the timeline interface, a user input requesting to add a new change to the content within the document at the time corresponding to the position of the control in the interactive timeline;

modify, in response to the received user input within the timeline interface, the document to include the new change to the content within the timeline interface;

add a new state of the document to the interactive timeline, the new state comprising a version of the document including the new change to the content according to the user input; and reposition, in response to the adding the new state of the document to the interactive timeline based on the received user input within the timeline interface, the position of the control to a location corresponding to the new state within the interactive timeline.

12. The non-transitory computer readable storage medium as recited in claim 11, further comprising instructions that, when executed by the at least one processor, cause the computer system to detect the selection of the marker, the detecting comprising:

identifying the time corresponding to the first position of the control; and retrieving the state of the document and the particular change corresponding to the time.

13. The non-transitory computer readable storage medium as recited in claim 11, further comprising instructions that, when executed by the at least one processor, cause the computer system to:

receive approval of a particular change to content within the document; and present an approval icon for the particular change within a state of the document at a time corresponding to the particular change.

14. The non-transitory computer readable storage medium as recited in claim 11, further comprising instructions that, when executed by the at least one processor, cause the computer system to:

receive approval of a particular change to the content within the document; and provide an indication of the approval by highlighting the particular change within a state of the document at a time corresponding to the particular change.

15. The non-transitory computer readable storage medium as recited in claim 11, further comprising instructions that, when executed by the at least one processor, cause the computer system to:

detect a repositioning of the control in the interactive timeline from the first position to a second position; and provide, within the timeline interface, a view of a second state of the document at a second time corresponding to the second position of the control in the interactive timeline by overlaying one or more changes for the second time corresponding to the second position of the control on the original version of the document.

16. The non-transitory computer readable storage medium as recited in claim 11, further comprising instructions that, when executed by the at least one processor, cause the computer system to add the new state of the document to the interactive timeline, the adding comprising:

adding the new state of the document to an end of the interactive timeline; and adding a marker to the end of the interactive timeline corresponding to the new state.

17. A document management system, comprising:

at least one processor;

at least one non-transitory computer readable storage medium storing instructions thereon, that, when executed by the at least one processor, cause the system to:

track changes made to content within a document;

provide, within a graphical user interface, a timeline interface comprising an interactive timeline representing a chronological order of a plurality of states of the document corresponding to the changes made to the content within the document, the interactive timeline comprising a control and one or more markers indicating a change to the document;

detect, via positioning of the control, a selection of a marker of the one or more markers;

determine a state of the document of the plurality of states of the document and one or more changes of the changes made to the content within the document for a time corresponding to a position of the control at the marker;

provide, within the timeline interface, a view of the state of the document at the time corresponding to the position of the control by overlaying the one or more changes for the time corresponding to the position of the control on an original version of the document;

receive, within the timeline interface, a user input requesting to add a new change to the content within the document at the time corresponding to the position of the control in the interactive timeline;

modify, in response to the received user input within the timeline interface, the document to include the new change to the content within the timeline interface;

add a new state of the document to the interactive timeline, the new state comprising a version of the document including the new change to the content according to the user input; and reposition, in response to adding the new state of the document to the interactive timeline based on the received user input within the timeline interface, the position of the control to a location corresponding to the new state within the interactive timeline.

18. The system as recited in claim 17, further comprising instructions that when executed by the at least one processor, cause the system to:

detect a second position of the control in the interactive timeline;

determine a second state of the document at a second time corresponding to the second position of the control; and provide, within the timeline interface, a view of the second state of the document at the second time corresponding to the second position of the control by overlaying one or more changes for the second time corresponding to the second position of the control on the original version of the document.

19. The system as recited in claim 17, further comprising instructions that when executed by the at least one processor, cause the system to add the new state of the document to the interactive timeline, the adding comprising:

adding the new state of the document to an end of the interactive timeline; and adding a marker to the end of the interactive timeline corresponding to the new state.

20. The system as recited in claim 19, wherein the instructions, when executed by the at least one processor, cause the system to reposition the position of the control to the location corresponding to the new state within the interactive timeline causes the computer system to reposition the position of the control to the end of the interactive timeline at the marker corresponding to the new state.

\* \* \* \* \*